(12) United States Patent
Marilly et al.

(10) Patent No.: US 9,032,056 B2
(45) Date of Patent: May 12, 2015

(54) DEVICE FOR PROCESSING THE MEASUREMENTS OF PARAMETERS AND/OR OF TRAFFIC STREAMS, FOR LOCAL ACCOUNTING OF THE USE OF RESOURCES, FOR AN EQUIPMENT ELEMENT IN A COMMUNICATION NETWORK

(75) Inventors: Emmanuel Marilly, Saint-Michel-sur-Orge (FR); Stéphane Betge-Brezetz, Paris (FR); Gérard Delegue, Cachan (FR); Olivier Martinot, Draveil (FR)

(73) Assignee: Alcatel Lucent, Boulogne-Billancourt (FR)

( * ) Notice: Subject to any disclaimer, the term of this patent is extended or adjusted under 35 U.S.C. 154(b) by 2118 days.

(21) Appl. No.: 10/932,053

(22) Filed: Sep. 2, 2004

(65) Prior Publication Data
US 2005/0055440 A1    Mar. 10, 2005

(30) Foreign Application Priority Data

Sep. 5, 2003 (FR) ...................................... 03 10503

(51) Int. Cl.
| | |
|---|---|
| *G06F 15/173* | (2006.01) |
| *H04L 12/26* | (2006.01) |
| *H04L 12/14* | (2006.01) |
| *H04M 15/30* | (2006.01) |
| *H04M 15/00* | (2006.01) |

(52) U.S. Cl.
CPC ............ *H04L 43/0882* (2013.01); *H04L 12/14* (2013.01); *H04L 12/1403* (2013.01); *H04M 15/30* (2013.01); *H04M 15/31* (2013.01); *H04M 2215/22* (2013.01); *H04M 2215/92* (2013.01); *H04M 2215/96* (2013.01)

(58) Field of Classification Search
USPC .................... 705/40, 400; 709/223, 224, 230
See application file for complete search history.

(56) References Cited

U.S. PATENT DOCUMENTS

| | | | | |
|---|---|---|---|---|
| 6,035,281 | A  * | 3/2000 | Crosskey et al. | 705/14.69 |
| 6,148,336 | A  * | 11/2000 | Thomas et al. | 709/224 |
| 6,338,046 | B1 * | 1/2002 | Saari et al. | 705/34 |
| 6,574,610 | B1 * | 6/2003 | Clayton et al. | 705/51 |
| 6,584,500 | B1 | 6/2003 | Arkko | |
| 7,054,926 | B1 * | 5/2006 | Abidi et al. | 709/223 |
| 2001/0001012 | A1 | 5/2001 | Culli | |
| 2002/0078194 | A1 * | 6/2002 | Neti et al. | 709/224 |
| 2002/0083186 | A1 | 6/2002 | Stringer | |
| 2002/0116486 | A1 * | 8/2002 | Toure et al. | 709/223 |
| 2003/0014367 | A1 * | 1/2003 | Tubinis | 705/64 |
| 2003/0065763 | A1 * | 4/2003 | Swildens et al. | 709/224 |
| 2003/0135474 | A1 * | 7/2003 | Circenis et al. | 705/400 |
| 2004/0083298 | A1 * | 4/2004 | El Mghazli et al. | 709/230 |
| 2004/0117311 | A1 * | 6/2004 | Agarwal et al. | 705/52 |
| 2005/0025144 | A1 * | 2/2005 | O'Mahony | 370/389 |
| 2005/0246282 | A1 * | 11/2005 | Naslund et al. | 705/52 |

* cited by examiner

*Primary Examiner* — Olabode Akintola
(74) *Attorney, Agent, or Firm* — Wolff & Samson

(57) ABSTRACT

A processing a device (D), for a network equipment element (RP) of a communication network equipped with an accounting and billing management module, includes processing means (MT) which are tasked, firstly, to determine, from values representing selected local parameters of their equipment element (RP) and/or of selected traffic streams received by this equipment element (RP), associated with the identifier of a customer in the network, usage data concerning the resources of the network corresponding to said customer identifier, and secondly, to transmit these usage data, and the identifier associated with them, to the accounting and billing management module for a possible billing of the customer designated by this identifier.

14 Claims, 2 Drawing Sheets

Figure 1:
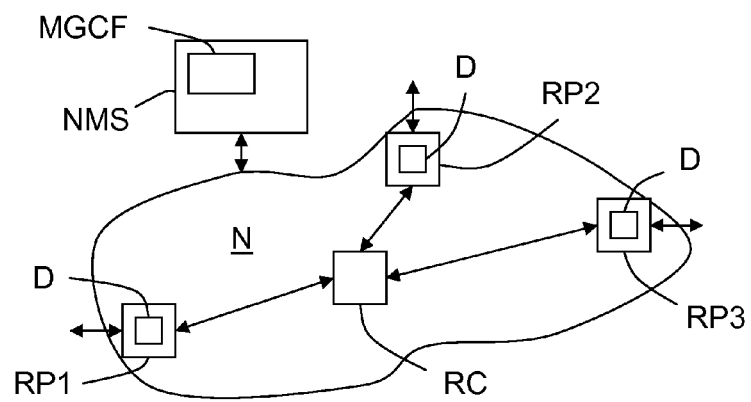

DEVICE FOR PROCESSING THE MEASUREMENTS OF PARAMETERS AND/OR OF TRAFFIC STREAMS, FOR LOCAL ACCOUNTING OF THE USE OF RESOURCES, FOR AN EQUIPMENT ELEMENT IN A COMMUNICATION NETWORK

The invention relates to the field of managed communication networks, and more particularly accounting for the use of resources by the customers of these networks.

The operators of certain managed communication networks place at the disposal of their customers services of the fixed-price or custom-built type based upon a predetermined use of the resources of their networks. The fixed-price case generally corresponds to an use of the resources which is based upon certain limitations, in terms of periods of use, for example, associated with a fixed billing arrangement. The "made-to-measure" case corresponds either to a fixed billing arrangement based upon selected limitations, or to billing which is dependent on the use of the resources. In either case, it is therefore necessary to continuously observe the resources used by each customer or group of customers, for accounting and billing where appropriate.

To this end, an accounting and billing manager, possibly forming part of the network management system (NMS), must first collect separate or aggregated values representing local parameters and traffic measurements (or streams) for each customer or group of customers, from the network equipment elements (which constitute what the man skilled in the art refers to as nodes). Then the accounting and billing manager must process all of these values in order to check whether or not they correspond to the methods of use proper to each customer or group of customers, and/or to determine the bills corresponding to them.

Such a centralized accounting and billing procedure is not really flexible and consumes many network resources, especially in terms of bandwidth, CPU time and storage capacity, thus limiting the performance of the network and the number of accounting and billing alternatives possible.

Another solution was proposed by American U.S. Pat. No. 6,584,500 for the Ericsson company. This is a billing system based on a single billing point, located at the access point of the network, at which a counter or meter associated with the user of the network is incremented in accordance with a charging rate associated with the distance of the recipient of the packets transmitted with the user.

This solution is hardly satisfactory since it is based only on the notion of distance (meaning on the number of hops of the packets) and is therefore very limiting, particularly in that it takes no account of the notion of service. This method is therefore incapable of development, and does not allow the billing policy to be altered. Neither does it allow this billing policy to be related to the nature of the information carried. Moreover, it turns out to be incapable of distinguishing between different data streams coming from the same source, and therefore of applying different billing policies to these different data streams.

Another proposal was put forward in American patent application US 2002/0083186. In this solution, each equipment element in the network modifies a field in the packets that represent a cumulative cost, which in the end can be used to determine an overall bill for the packets of a data stream.

Such an approach therefore requires modification of the information transmission protocols, which in turn necessitates modification of the current standards, which is a drawback in practice. Moreover, it requires modification of all the equipment elements in a network, in order that they should be capable of modifying the packets in the recommended manner. Such a modification is quite obviously costly, or even impossible to implement for the operator of a network that includes a large number of equipment elements.

Finally, for reasons of standardization, it may turn out to be a solution with little development potential, which does not allow easy deployment of new billing policies.

An object of the invention is therefore to remedy all or part of the aforementioned drawbacks.

To this end, it proposes a processing device for a network equipment element in a communication network equipped with an accounting and billing management module, including processing means which are tasked, firstly, to determine, from values representing chosen local parameters from their equipment and/or chosen traffic streams received by this equipment, associated with the identifier of a customer or group of customers in the network, usage data concerning the resources of the network corresponding to said customer identifier, and secondly, to transmit these usage data, and the identifier associated with them, to the accounting and billing management module, for the possible billing of each customer designated by this identifier.

Accounting for the use of the resources is thereby decentralized towards various equipment elements in the network, such as routers (core or edge type) or switches, for example. The volume of data transferred between the network equipment and the manager is therefore reduced very considerably, thereby reducing the bandwidth used to this end and the quantity of processing to be effected by the accounting and billing manager.

Here traffic refers to both a stream of data packets and the aggregation of streams of data packets.

The invention is particularly well suited, though not in any limited manner, to networks of the type described as "with equipment management on the basis of policy rules". However it is also particularly well suited to networks in which only the accounting and billing management module, possibly belonging to the network management system, effects management by means of specific policy rules. In these situations, the processing means are then tasked to determine the usage data in accordance with certain dedicated policy rules which have been enforced by their network equipment.

Here the expression "policy rule" refers to a rule of the "if <condition> then <action>" type. These policy rules are prepared by the operator (or the supervisor) of the network in accordance with the equipment of which it is composed and with the contracts signed with its customers.

The device according to the invention can include other characteristics, which can be taken separately or in combination, and particularly:

processing means which include analysis means tasked to determine the values in the associated network equipment. For example, the analysis means are arranged so as to perform measurements on local parameters, or local measurements on traffic (or traffic streams), or traffic measurements of the "end-to-end" type. Any type of traffic can thus be subjected to this measurement process, and particularly the network data traffic, the service data traffic, and the customer data traffic, some policy rules can be representative of at least one calendar policy, the analysis means can be tasked, firstly, to deduce some of the values of the data representing profiles and/or signatures (or baselines) and/or of trends and/or discontinuities, secondly, to compare these data to profile and/or signature and/or trend and/or discontinuity data, defined by at least some of the policy rules enforced in their network equipment and associated with chosen consumption or usage values, and thirdly, in the event of recognition of a profile or a signature or a trend or a discontinuity, to check whether the use that the customer is making of the resources is in accordance with this or that, in order, in the affirmative, to associate a corresponding first consumption value (or usage data value) with this use. In the negative, meaning in the event of non-identification associated with failure to comply with a given usage by a customer, one can also associate a second consumption value that includes a penalty for example, with this usage.

the processing means can be tasked, firstly, to store some of the determined values in order to aggregate these with values previously determined, secondly, to compare each aggregation of values to a threshold level defined by some of the enforced policy rules, and thirdly, in the event of the threshold level being exceeded, to order their network equipment to stop the traffic associated with the values involved in exceeding the threshold (for management of the "prepaid" mode as close as possible to the equipment, for example), the processing means can be tasked to deliver usage data representing of the use of resources and/or a profile of the use of resources during a chosen time interval, the processing means can be arranged so as to transmit the usage data to the accounting and billing management module, either automatically and periodically or at its request, management resources coupled to the processing means and tasked to configure them in accordance with configuration instructions transmitted by the accounting and billing management module.

The processing device can be installed in a unit which is designed to be connected to a network equipment element, or it can be incorporated directly into a network equipment element. In fact, it can be arranged in accordance with requirements in the area of accounting/billing and/or of the services already present in the network equipment, or indeed in accordance with the use of the accounting/billing service by the operator.

Figure 2:
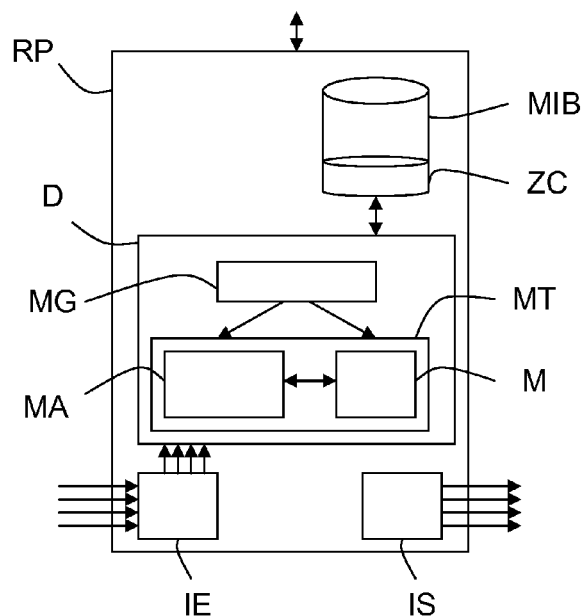
Figure 3:
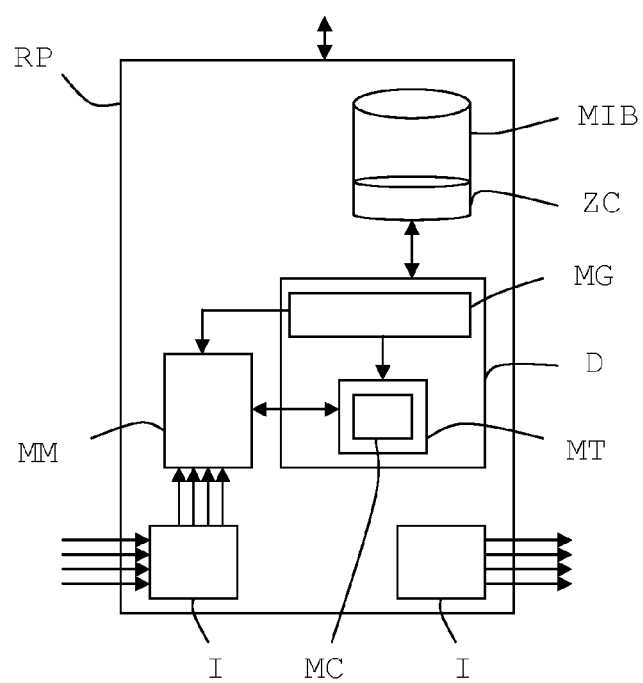

Other characteristics and advantages of the invention will appear on examining the following detailed description, and appended drawings, in which:

FIG. 1 schematically illustrates a communication network that includes a network management system (NMS), equipped with an accounting and billing management module, and with network equipment elements according to the invention, FIG. 2 schematically illustrates a first example of implementation of network equipment fitted with a first example of implementation of a processing device according to the invention, and FIG. 3 schematically illustrates a second example of implementation of network equipment fitted with a second example of implementation of a processing device according to the invention.

The appended drawings can not only serve to complete the invention, but also contribute to its definition otherwise.

An object of the invention is to allow optimization of the accounting and billing process for the use of resources in a managed communication network. Here, the expression "managed network" refers to a network which includes a network management system (NMS).

In what follows, it is considered, by way of an illustrative example, that the communication network is at least partially of the Internet (IP) type. However, the invention also applies to other types of network, such as, for example, to the transmission networks of the WDM, SONET or SDH types, to data networks of the ATM type, to speech networks of the conventional or mobile type, or to mixed speech-data networks such as those of the NGN type.

Here "IP network" refers to a multi-domain context composed of a collection of IP domains and/or subdomains connected to each other.

As illustrated very schematically in FIG. 1, an internet network (N) can be compared to a set of network equipment (or nodes) (RPi and RC), connected together so as to effect the routing of data packets that they receive, and to a set of communication terminals (not shown) connected to certain network equipment elements (or nodes) (Rpi), possibly via one or more other terminals of the access server type, so as to exchange data packets between them.

Here "communication terminal" refers to any network equipment capable of exchanging data packets, such as a portable or fixed computer, a fixed or mobile telephone, a personal digital assistant (PDA), or a server for example.

The network equipment elements (or nodes) are generally of the edge router type (RPi where i=1 to 3, but it can take any value of two or more), and core router type. Only a single core router (RC) has been shown here, but there can be several of these.

Usually, the communication terminals are each connected to one of the edge routers (RPi), which act as their access node to the internet network (N), and the edge routers (RPi) are generally connected by means of one or more core routers (RC).

In addition, in a traditional. IP network, each domain or subdomain has its own edge routers (RPi) and its own core routers (RC). In a network of the IP/MPLS type, the network equipment elements are called label switch routers, and come either in the form of routers or in the form of ATM switches controlled by a routing function.

The network (N) also includes a network management system (NMS) coupled to its network equipment elements (RPi and RC) in particular. This network management system (NMS), also known as a network operating system, particularly allows the manager (or supervisor) of the network to manage the network equipment elements (RPi and RC) of which it is composed.

To this end, the network equipment elements (RPi and RC) are arranged so as to be able to exchange data with the management system (NMS), in accordance with a network management protocol, such as the RFC 2571-2580 simple network management protocol (SNMP), for example. Of course other network management protocols can also be used, and particularly the TL1, CORBA or CMISE/CMIP protocols.

As indicated in the introduction section, the operator of a managed network which places services associated with resources at the disposal of its customers must observe and compute the use that each customer (or group of customers) is making of the resources of the network in order that it is in compliance with the contract that it has agreed with said customer.

In a managed network, accounting for the resources used by each customer, and the actions which flow from this, particularly the interruption firstly of a multiservice offer, is supervised by an accounting and billing management module (MGCF) in the case where limits have been exceeded or in the case of billing. This MGCF module can be installed in the network management system (NMS), as illustrated in FIG. 1. However it can also be external to the (NMS) and possibly connected to the latter. In what follows, it is considered, by way of example, that the MGCF module forms an integral part of the network management system (NMS).

In a conventional managed network, the accounting and billing management module (MGCF) itself performs the accounting for the use of resources by each customer, from information data transmitted by the network equipment elements (RP and RC) representing measurements effected on their respective local parameters and on the traffic streams that they receive.

The invention allows performing this function differently. To this end, it proposes to perform all or part of the accounting, for use of the resources that they control directly, at the level of network equipment elements RP and/or RC respectively.

More precisely, the invention proposes the installation of a processing device (D) dedicated at least to the accounting process, in (or coupled to) some at least of the network equipment, and particularly in (or to) its edge routers (RP), and especially those which allow terminals to connect to the network (N).

In what follows, it is considered that the processing devices (D) are installed in the edge routers (RP) of the network (N). However, alternatively, at least some of the processing devices (D) could include a unit connected to an edge router (RP) (or to another type of network equipment element).

As illustrated in FIG. 2, a processing device (D) according to the invention, includes at least one processing module (MT) which is tasked, firstly, to determine data representing the use that each customer associated with it is making of the resources of the network that it controls. This determination is performed from values representing selected local parameters of edge router (RP), in which the device (D) is installed, and/or of one or more selected traffic streams received by this edge router (RP), which are associated with each customer identifier or of group of customers. The processing module (MT) is then tasked to transmit the usage data that it has determined, and the identifier associated with them, to the (MGCF) module of the network management system (NMS) in order that it may, where appropriate, perform a billing process in relation to the customer designated by the identifier.

Each processing device (D) is therefore specifically configured in accordance with the types of observation and accounting that it must perform taking into account the customers who are associated with it and of the resources of the network that it controls. It is worth noting, however, that a given configuration can possibly concern a set of processing devices (D).

This configuration can be performed in various ways. However, it is particularly advantageous that it should be performed by means of what the man skilled in the art refers to as policy rules. As will be the case in what follows, by way of an illustrative example, this type of configuration requires that at least the accounting and billing management module (MGCF) of the network should be arranged so as to manage the processing devices (D) by means of policy rules. But of course the network can be entirely of the type known as "with equipment management on the basis of policy rules".

A policy rule is a rule of the "if <condition> then <action>" type. Sets of policy rules constitute a policy designed by the operator of the network (N) and dedicated to a particular type of management, such as observation and accounting for example. The policy rules are transmitted to the different managed equipment elements of the network (N) by the network management system (NMS). They define the processing which must be done by the network equipment concerned in order to implement the portion of policy defined by the received policy rules.

In this type of network, each equipment element in the managed network includes a management information base (MIB), also known as an object instance base. By convention, each MIB stores management data representing the values of information fields which characterize the associated managed equipment. In addition, each MIB is associated with a management information base definition (not shown), also called MIB definition, stored in the network management system (NMS).

The policy rules, and particularly those dedicated to observation and accounting, can be stored in a dedicated module (possibly with a rule engine to which we will return later). But these policy rules can also be stored in a dedicated zone of the MIB.

The values, which allow the processing module (MT) to determine the usage data intended for the (NMS), can be determined either by the processing device (D), as illustrated in FIG. 2, or by an edge router (RP), and supplied to the processing device (D) as we will see later, with reference to FIG. 3.

In the implementation example illustrated in FIG. 2, the processing device (D) includes an analysis module (MA) tasked to perform all the measurements necessary for the processing module (MT) to determine the usage data that it must transmit to the management system (NMS), in accordance with the enforced policy rules.

The analysis module (MA) is therefore particularly tasked to filter certain traffic streams received by the input interfaces (IE) of the router (RP) in which it is installed, in the light of the enforced policy rules, in order to perform measurements on the latter which can be of the local or "end-to-end" type, depending on the type of the router. The other, unfiltered traffic streams, just as those filtered, then continue their journey and leave the router (RP) via its output interfaces (IS).

Traffic of the end-to-end type is a stream of data packets or a packet of data in a data stream which passes integrally through several networks or one network or at least one domain or subdomain of a multi-domain context network, such as an IP network. Here, "passes integrally through" refers to the fact of entering into a network or a domain via one of its edge routers (RPi), called the ingress (or entry) router, and exiting via another of its edge routers (RPi)', known as the egress (or output) router. It is worth noting that in the case of traffic streams of the end-to-end type, end-to-end measurements can be performed either at the two end points of the network, independently of whatever exists or happens between these two measuring points, or at one of the end points. Each measuring point can be placed at one end of a network or of a collection of networks or indeed of one or more domains of a multi-domain network. For example, in the case of a tunnel of the MPLS of a LSP type, measurement of the tunnel performance (such as the data speed for example) is effected simply at the input to said tunnel by a simple reading of the corresponding parameters stored in the MIB.

The analysis module (MA) can perform measurements on network data traffic streams, or customer data traffic streams, or indeed on application or service data traffic streams, for example. As an example, the measurements can concern UDP or TCP parameters, or the internet traffic of a customer, or the speech on IP, or video on demand (VoD) (MPEG parameters), or traffic of an individual LSP, or indeed traffic of a virtual private network of the IP-VPN type.

In addition, the analysis module (MA) can be arranged so as to determine the values taken by local edge router (RP) parameters, which can be used for accounting purposes. These measurements of local parameters concern aggregated data streams and not merely a single stream as is the case with the local or end-to-end measurements effected on the traffic streams. It concerns a local measurement of the bandwidth at the level of an edge router (RP) interface, for example, or measurement of the use of its computing capabilities (CPU), or indeed measurement of the packet loss rate.

In addition, one part of the analysis module (MA) can possibly be arranged so as to perform more or less complex analyses on the filtered traffic streams. This part can thus be tasked, in a first step, to determine data representing a profile or signature (baseline) for a given customer identifier or a trend or a discontinuity. Once these data have been determined, the analysis module (MA) then compares them with the data of the profile or of the signature or of the trend or of the discontinuity which have been defined for the customer concerned by certain enforced policy rules in its router (RP) and which are associated with predefined consumption values (or usage data). Then, when the analysis module (MA) recognizes a profile or a signature or a trend or a discontinuity, it checks whether or not the use of the resources by the customer is in accordance with this or that. In the affirmative, the analysis module (MA) associates with this use a corresponding first consumption value (or usage data). In the negative, the analysis module (MA) associates with said use a second corresponding consumption value (or usage data) which takes account of a penalty for example, given that in this situation it is the customer who is not complying with the predefined use.

Finally, where appropriate, the MIB can act as an interface with the analysis module (MA).

It is worth noting that the analysis module (MA) can be used by the network equipment to perform traffic measurements other than those dedicated to accounting for the consumption of resources. It can also be "clamped" so as to supply, as standard, only measurements that are useful to the processing module (MT), and when unclamped, it can allow the operator to effect other types of measurements where appropriate.

As indicated previously, the processing module (MT) is tasked to determine usage data from the values which are supplied to it here by the analysis module (MA) to which it is coupled.

More precisely, the processing module (MT) includes a computing module (MC) tasked to calculate the use made of the resources by each customer for whom it is responsible, in accordance with the accounting policy associated with it and/or the calendar policy of the operator.

The calendar policy is defined here by dedicated policy rules. For example, it defines the off-peak periods and the peak periods which correspond to different charging rates. It is worth noting that the calendar policy can be used by the analysis module (MA) when it is determining the values, and/or by the computing module (MC) when it is determining the usage data from said values.

Calculation of the use (or consumption) of resources can be designed to deliver usage data of the instantaneous type or of the aggregated type (meaning cumulative over time). In order to allow the calculation of aggregated usage data, the computing module (MC) can store certain received values in a dedicated memory or indeed in a dedicated zone (ZC) of the MIB, as illustrated in FIG. 2. Storage in a dedicated zone (ZC) of the MIB also allows the management system (NMS) to read the usage data directly from the exterior. The new received values, which correspond to the aggregated usage data, can be added to the old values of same type, the result of the addition then replacing the previous cumulative value in the dedicated zone (ZC).

It is worth noting that the usage data, which are determined by the computing module (MC), are not necessarily representative of an incidence of use. Indeed, they can be representative of a usage profile or of a behavior.

Any type of accounting can be envisaged. For example, one can use consumption value units (CVU). Such a CVU unit can, for example, correspond to a quantity (X) of bandwidth used for one hour in the peak period, or to a quantity (Y) of bandwidth used for one hour in the off-peak period, or indeed to a period of use of an application (Z).

The computing module (MC) of the processing module (MT) can also include a rule engine used to define several categories of policy rules, such as, basic or complex policy rules for example.

Basic policy rules can define the use of resources during a chosen time interval for example.

Complex (or advanced) policy rules can, for example, define the use of resources that are adaptable to suit particular circumstances and/or that are modifiable. As an example, policy rules can be used to manage the use of resources (or services) in prepaid mode. In this case, the processing module (MT), and more precisely its computing module (MC), is tasked to order its edge router (RP) to prevent the designated customer from continuing to use resources when it has exhausted its prepaid consumption value units (CVUs).

It is worth noting that this management function for interdiction of use can be implemented in other situations, and particularly in the case of fixed-price contracts, for example, to manage the respective periods of use of each service covered by the contract. By way of an illustrative example, a contract can concern, firstly, a first service corresponding to an unlimited internet access, secondly, a second service corresponding to the use of speech (voice) on IP (VoIP) in accordance with a first charging rate, during the off-peak periods and in accordance with a second charging rate during the other periods, and thirdly, a third service corresponding to use of the video-on-demand service (VoD) limited to one hour per day. In this case, as soon as the computing module (MC) has detected from the values supplied by the analysis module (MA) that the customer has used the third service for more than one hour, it orders its edge router (RP) to prevent the customer from continuing to use this VoD service until the following day. Likewise, when the computing module (MC) detects from the values supplied by the analysis module (MA) that the customer is using the second service outside of the off-peak period, it modifies its method of accounting in respect of this consumption.

Any other function appropriate to a particular accounting procedure can be envisaged. Thus the processing module (MT) can be arranged to respond to requests from the customers that it is managing, received by its edge router (RP), and requesting transmission of the current value of their consumption. More precisely, on receipt of such a request, the processing module (MT) accesses the dedicated zone (ZC) of the MIB in order to extract from it the cumulative value representing the customer's consumption concerned, and then orders the edge router (RP) to transmit this value to the terminal of the requesting customer. However the operator can also have direct access to this parameter stored in the dedicated zone (ZC) of the MIB.

As illustrated in FIG. 2, the processing device (D) according to the invention can also include a management module (MG) coupled to the processing module (MT), and particularly to its computing module (MC) and/or to its analysis module (MA), and tasked to configure them in accordance with configuration instructions received from the network management system (NMS), and particularly from its MGCF module. These configuration instructions are preferably dedicated policy rules for configuration of the modules of the processing device (D).

These instructions (or policy rules) can be transmitted by the MGCF module either directly in the form of commands which conform to the management protocol (here SNMP) of the edge router (RP) concerned, or via an application programming interface (API) or via the MIB.

In addition, the management module (MG) can, for example, be arranged so as to interact with the MIB either to be configured by the latter, or to establish or obtain inputs from the latter. The MIB can in fact be static (to establish and supply inputs), configurable (to establish and supply inputs and configure the management module (MG)), or programmable (to create new inputs and establish and supply inputs when it receives a new accounting policy from the management system (NMS)).

In order to prevent attacks or fraud, it is preferable to make secure the exchanges relating to the configuration, the management and the transmission of reports.

An example of the enforcement of policy rules, dedicated to accounting for a customer (C1) in an edge router (RP), will now be described.

In a first step, the operator signals to the MGCF module that it desires the enforcement for customer (C1) of the accounting policy defined by the following high-level rules:
   for access to the Internet, apply the standard access accounting policy,
   for the use of speech (voice) on IP (VoIP), apply the accounting policy for the off-peak period, and
   for the video-on-demand (VoD) service, apply the VoD accounting policy, also described as "one hour per month".

In a second step, the MGCF module transforms these high-level rules into policy rules (of a lower level), given below.

For the customer (C1) in possession of IP address 132.25.24.124:
   if Internet access (application port XXX or protocol for example) is used during the current month, then increase the value of the consumption by one consumption value unit (CVU),
   if speech on IP (application port YYY or protocol, for example) is used during the peak period, then increase the value of the consumption by two consumption value units (CVUs) per period of use of 60 seconds, and if speech on IP is used during the off-peak periods, then increase the value of the consumption by two consumption value units (CVUs) per period of use of 120 seconds, and finally if speech on IP is used during the other periods, then increase the value of the consumption by two consumption value units (CVUs) per period of use of 90 seconds,
   if video-on-demand (application port ZZZ or protocol for example) is used, then calculate the time of use. When the period of use becomes equal to one hour, then stop all video feeds until the end of the current month,
   transmit the value of the consumption (the usage data) of the customer (C1) to IP address 155.63.98.125 (MGCF module), on the first day of each month using the SNMP protocol.

The MGCF module then transmits the policy rules to the processing device (D) which is installed in (or coupled to) the edge router (RP) in charge of the customer (C1).

In a third step, the processing device (D) enforces the received policy rules by configuring the analysis module (MA) so that that it filters the data stream of the customer (C1) in possession of IP address 132.25.24.124 which arrives at the XXX, YYY and ZZZ ports of its edge router (RP) (or which uses the designated protocols). When such a stream is detected and identified, the analysis module (MA) performs the measurements in accordance with its configuration, and transmits the values of the measurements to the computing module (MC) in order that it can determine the consumption value (the usage data) of this stream taking into account the accounting policy rules and of any calendar policy rules. On the first day of each month, a report containing the value of the customer C1's consumption is then transmitted to the MGCF module.

In a fourth step, when the MGCF module receives the report, it bills the customer (C1) in the light of the value of its consumption and of the local billing policy, as well as the value of the local currency where appropriate. It can then transmit the bill to the customer (C1) by any appropriate means (letter, fax or e-mail).

As mentioned previously and as illustrated in FIG. 3, the processing device (D) according to the invention may not include an analysis module (MA). The latter is then replaced by a simple measurement module (MM) forming part of the network equipment element (RP) or coupled to it. In this case, the processing module (MT) essentially includes a computing module (MC) which also performs the analysis functions described previously and effected by the analysis module (MA). In addition, the management module (MG) is preferably tasked to configure the measurement module (MM) in accordance with the received policy rules, so that that it can deliver the values necessary for determination of the usage data to the computing module (MC) of the processing module (MT). The operation of the processing device (D) is then more or less identical to that previously described with reference to FIG. 2.

The processing device (D) according to the invention, and particularly its processing module (PM) and its management module (MG), can be implemented in the shape of electronic circuits, software (computer) modules, or a combination of circuits and software.

The invention is not limited to the embodiments of the processing device and of the network equipment described above only by way of an example, but it also encompasses all of the alternatives which can be envisaged by the man skilled in the art in the context of the following claims.

Thus, in the foregoing, we have described an example of the implementation of the invention in a communication network with equipment management on the basis of policy rules. But, the invention is also, and particularly, suitable for the networks in which only the accounting and billing manager effects management by means of specific policy rules.

In addition, in the foregoing we have described an accounting and billing management module incorporated into the network management system (NMS). However this accounting and billing management module can be external to the (NMS), and connected to the latter where appropriate.

The invention claimed is:

1. A processing device for a network equipment element in a communication network, the communication network equipped with an accounting and billing management module, wherein the processing device comprises:
   processing means within the processing device, said processing device within the network equipment element, determining from values representing selected local parameters of said equipment element and of selected traffic streams received by said equipment element associated with an identifier of at least one customer of said network, usage data with respect to resources of the network corresponding to said customer identifier, in accordance with dedicated policy rules enforced by said associated network equipment element, wherein the dedicated policy rules can be modified at the network equipment element;

wherein the dedicated policy rules are transmitted to the network equipment element directly in the form of commands which conform to a simple network management protocol (SNMP), or via an application programming interface (API), or via the management information base (MIB);

wherein said processing means are arranged to store some of said determined values in a memory so as to aggregate these determined values with values previously determined, to compare each aggregation of values with a threshold level defined by certain of said policy rules, and in the event of said threshold level being exceeded, to order said associated network equipment element to interrupt the traffic associated with the values which have been exceeded; and wherein the processing device transmits said usage data and the associated identifier to said accounting and billing management module for billing of each customer designated by said identifier.

2. A device according to claim 1, wherein said processing means include analysis means and are arranged to determine said values in said associated network equipment element.

3. A device according to claim 2, wherein said analysis means are arranged to perform measurements chosen from a group that includes at least measurements of local parameters, local measurements of traffic passing through said network equipment element, and measurements of traffic of the "end-to-end" type passing through said network equipment element.

4. A device according to claim 1, wherein said traffic streams are chosen from a group that includes at least network data traffic, service data traffic, and customer data traffic.

5. A device according to claim 1, wherein certain of said policy rules are representative of at least one calendar policy.

6. A device according to claim 2, wherein said analysis means are arranged i) to deduce data representing profiles and/or signatures and/or trends and/or discontinuities from some of said values, ii) to compare these data with profile and/or signature and/or trend and/or discontinuity data defined by at least some of said enforced policy rules in said associated network equipment element and associated with chosen values, and iii) in the event of recognition of a profile and/or of a signature and/or of a trend and/or of a discontinuity, to check whether the use that the customer is making of the resources is correct and, in the affirmative, to associate one of said chosen values with said deduced data.

7. A device according to claim 1, wherein said processing means are arranged to deliver usage data representing the use of a resource and/or a resource usage profile for a chosen time interval.

8. A device according to claim 1, wherein said processing means are arranged to transmit said usage data automatically and periodically to said accounting and billing management module.

9. A device according to claim 1, wherein said processing means are arranged to transmit said usage data on the order of said accounting and billing management module.

10. A device according to claim 1, wherein the device further comprises management resources coupled to said processing means and arranged to configure the processing means in accordance with configuration instructions transmitted by said accounting and billing management module.

11. A device according to claim 1, wherein the device is installed in a unit that is suitable to be connected to a network equipment element.

12. A processing device according to claim 1, wherein said dedicated policy rules comprise conditional requirements determined by an operator of the communication network.

13. A network equipment element for a communication network equipped with an accounting and billing management module, characterized in that the network equipment element includes a processing device, wherein the processing device comprises:

processing means within the processing device, said processing device within the network equipment element, determining from values representing selected local parameters of said equipment element and of selected traffic streams received by said equipment element associated with an identifier of at least one customer of said network, usage data with respect to resources of the network corresponding to said customer identifier, in accordance with dedicated policy rules enforced by said associated network equipment element, wherein the dedicated policy rules can be modified at the network equipment element;

wherein the dedicated policy rules are transmitted to the network equipment element directly in the form of commands which conform to a simple network management protocol (SNMP), or via an application programming interface (API), or via the management information base (MIB);

wherein said processing means are arranged to store some of said determined values in a memory so as to aggregate these determined values with values previously determined, to compare each aggregation of values with a threshold level defined by certain of said policy rules, and in the event of said threshold level being exceeded, to order said associated network equipment element to interrupt the traffic associated with the values which have been exceeded; and wherein the processing device transmits said usage data and the associated identifier to said accounting and billing management module for billing of each customer designated by said identifier.

14. A network equipment element according to claim 13, wherein the network equipment element is chosen from a group including routers and switches.

* * * * *